United States Patent
Chen et al.

(10) Patent No.: US 7,065,465 B2
(45) Date of Patent: *Jun. 20, 2006

(54) METHOD AND SYSTEM FOR MULTI-SENSOR DATA FUSION

(75) Inventors: Hai-Wen Chen, Orlando, FL (US); Teresa L. Olson, Winter Garden, FL (US)

(73) Assignee: Lockheed Martin Corporation, Orlando, FL (US)

( * ) Notice: Subject to any disclaimer, the term of this patent is extended or adjusted under 35 U.S.C. 154(b) by 568 days.

This patent is subject to a terminal disclaimer.

(21) Appl. No.: 10/395,265

(22) Filed: Mar. 25, 2003

(65) Prior Publication Data

US 2003/0186663 A1  Oct. 2, 2003

Related U.S. Application Data

(60) Provisional application No. 60/367,282, filed on Mar. 26, 2002.

(51) Int. Cl.
*G06F 19/00* (2006.01)
*G06F 17/40* (2006.01)

(52) U.S. Cl. ............... 702/116; 324/614; 702/189; 702/190; 702/192; 702/193

(58) Field of Classification Search ......... 455/226.3, 455/205; 702/189, 116, 190, 191, 192, 193; 324/614

See application file for complete search history.

(56) References Cited

U.S. PATENT DOCUMENTS

| | | | | |
|---|---|---|---|---|
| 5,341,142 A * | 8/1994 | Reis et al. | ...................... | 342/64 |
| 6,006,163 A * | 12/1999 | Lichtenwalner et al. | ...... | 702/36 |
| 6,215,983 B1 * | 4/2001 | Dogan et al. | .............. | 455/63.1 |
| 6,453,272 B1 * | 9/2002 | Slechta | ........................ | 702/190 |
| 6,487,523 B1 * | 11/2002 | Jarman et al. | ............... | 702/189 |
| 6,512,996 B1 * | 1/2003 | Praskovsky et al. | ......... | 702/189 |
| 6,559,657 B1 * | 5/2003 | McCarthy et al. | ........... | 324/642 |
| 6,763,322 B1 * | 7/2004 | Potyrailo et al. | ............ | 702/189 |
| 6,868,346 B1 * | 3/2005 | Larson et al. | .................. | 702/45 |

(Continued)

OTHER PUBLICATIONS

Cross-correlation analyses of nonlinear systems with spatiotemporal inputs [visual neurons] Hai-Wen Chen; Jacobson, L.D.; Gaska, J.P.; Pollen, D.A.; Biomedical Engineering, IEEE Transactions on vol. 40, Issue 11, Nov. 1993 Page(s):1102-1113.*

(Continued)

*Primary Examiner*—Anthony Knight
*Assistant Examiner*—Michael B. Holmes
(74) *Attorney, Agent, or Firm*—Birch, Stewart, Kolasch & Birch, LLP

(57) ABSTRACT

A multi-sensor data fusion system and method provides adaptive weighting of the contributions from a plurality of sensors in the system using an additive calculation of a sensor reliability function for each sensor. During a predetermined tracking period, data is received from each individual sensor in the system and a sensor reliability function is determined for each sensor based on the SNR (signal-to-noise ratio) for the received data from each sensor. Each sensor reliability function is individually weighted based on the SNR for each sensor and a comparison of predetermined sensor operation characteristics for each sensor and a best performing (most reliable) sensor. Additive calculations are performed on the sensor reliability functions to produce both an absolute and a relative reliability function which provide a confidence level for the multi-sensor system relating to the correct classification (recognition) of targets and decoys.

27 Claims, 8 Drawing Sheets

U.S. PATENT DOCUMENTS 6,909,997 B1 * 6/2005 Chen et al. .................. 702/189
6,944,566 B1 * 9/2005 Chen et al. .................. 702/116

OTHER PUBLICATIONS

Modeling and identification of parallel nonlinear systems: structural classification and parameter estimation methods Hai-Wen Chen; Proceedings of the IEEE vol. 83, Issue 1, Jan. 1995 Page(s):39-66.*

Modeling and identification of parallel and feedback nonlinear systems Hai-Wen Chen; Decision and Control, 1994., Proceedings of the 33rd IEEE Conference on vol. 3, Dec. 14-16, 1994 Page(s):2267-2272 vol. 3.*

Defining optimal spatial resolution for high-spectral resolution infrared sensors Hung-Lung Huang; Frey, R.; Smith, W.L.; Zhou, D.K.; Bloom, H.; Geoscience and Remote Sensing Symposium, 2003. IEEE, vol. 1, Jul. 21-25, 2003 Page(s):366-368 vol. 1.*

300 A current sensor using amorphous wire core [invertor control of AC motors] Kashiwagi, Y.; Kondo, T.; Mitsui, K.; Mohri, K.; Magnetics, IEEE Transactions on vol. 26, Issue 5, Sep. 1990 pp. 1566-1568.*

Iterative and sequential algorithms for multisensor signal enhancement Weinstein, E.; Oppenheim, A.V.; Feder, M.; Buck, J.R.; Signal Processing, IEEE Transactions on vol. 42, Issue 4, Apr. 1994 pp. 846-859.*

Gain calibration methods for radio telescope arrays Boonstra, A.-J.; van der Veen, A.-J.; Signal Processing, IEEE Transactions on [see also Acoustics, Speech, and Signal Processing, IEEE Transactions on] vol. 51, Issue 1, Jan. 2003 pp. 25-38.*

Noninvasive sensor arrays: separate evaluation of inputs for adaptive noise reduction Ciaccio, E.J.; Micheli-Tzanakou, E.; Bioengineering Conference, 1991., Proceedings of the 1991 IEEE Seventeenth Annual Northeast Apr. 4-5, 1991 Page(s):243-244.*

* cited by examiner

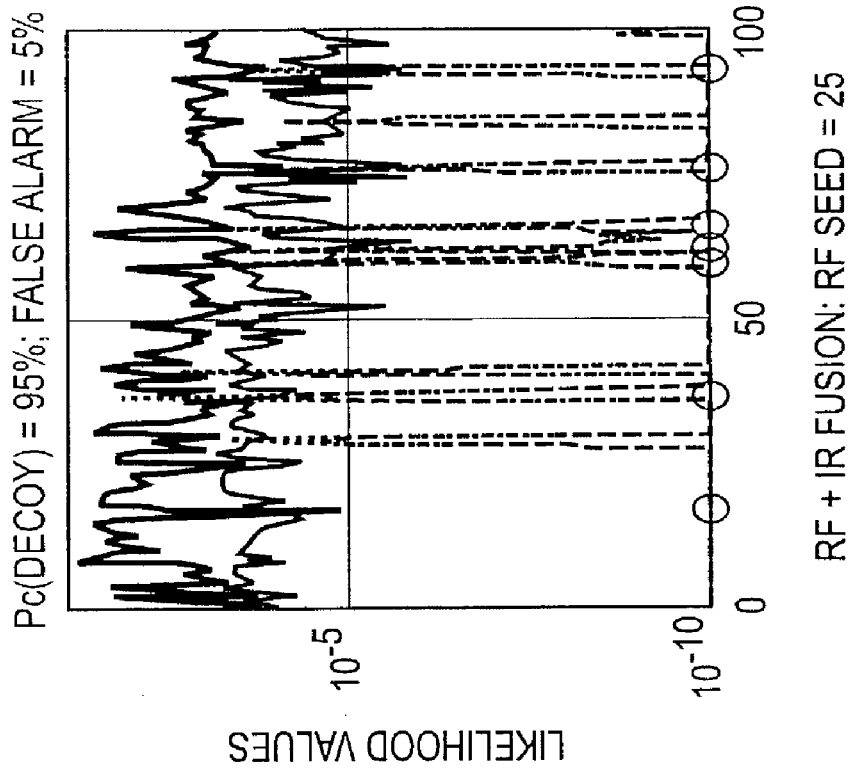
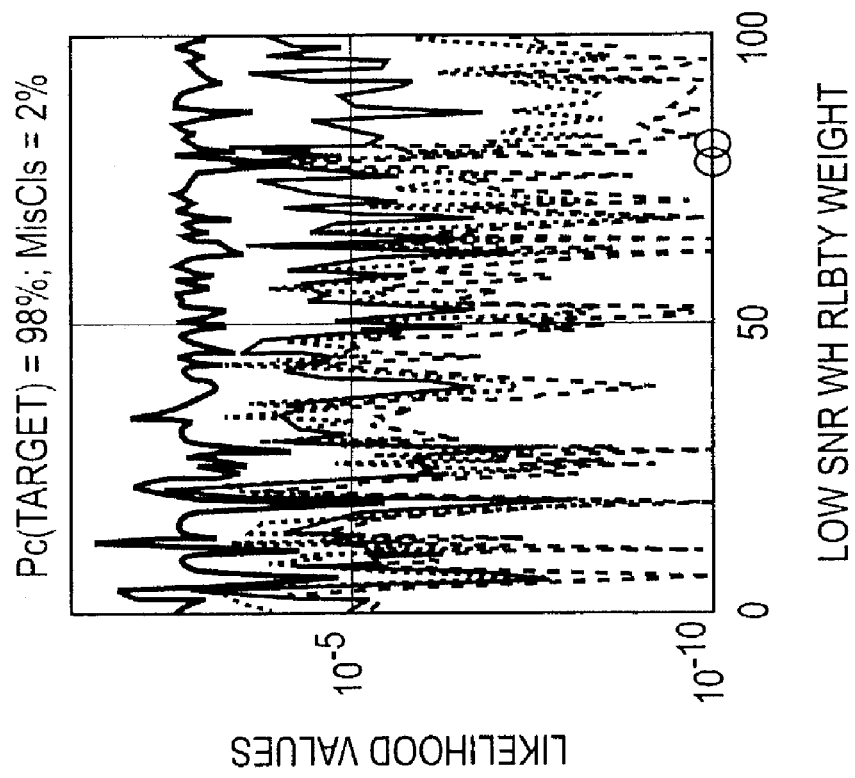

METHOD AND SYSTEM FOR MULTI-SENSOR DATA FUSION

CROSS-REFERENCE

This application claims the benefit of U.S. provisional application Ser. No. 60/367,282, filed Mar. 26, 2002.

TECHNICAL FIELD

The present invention relates generally to data fusion. It particularly relates to a data fusion method that provides an adaptive weighting technique using reliability functions to integrate data from a plurality of sensors.

BACKGROUND OF THE INVENTION

Sensor systems incorporating a plurality of sensors (multi-sensor systems) are widely used for a variety of military applications including ocean surveillance, air-to-air and surface-to-air defense (e.g., self-guided munitions), battlefield intelligence, surveillance and target detection (classification), and strategic warning and defense. Also, multi-sensor systems are used for a plurality of civilian applications including condition-based maintenance, robotics, automotive safety, remote sensing, weather forecasting, medical diagnoses, and environmental monitoring (e.g., weather forecasting).

To obtain the full advantage of a multi-sensor system, an efficient data fusion method (or architecture) may be selected to optimally combine the received data from the multiple sensors. For military applications (especially target recognition), a sensor-level fusion process is widely used wherein data received by each individual sensor is fully processed at each sensor before being output to a system data fusion processor. The data (signal) processing performed at each sensor may include a plurality of processing techniques to obtain desired system outputs (target reporting data) such as feature extraction, and target classification, identification, and tracking. The processing techniques may include time-domain, frequency-domain, multi-image pixel image processing techniques, and/or other techniques to obtain the desired target reporting data.

An exemplary, prior art example of a multi-sensor, sensor-level fusion (process) system 100 for automatic target recognition (ATR) is shown in FIG. 1. Advantageously, system 100 may include a plurality of sensors 102, 104, 106, 108 which may include RF sensors such as MMW radar (active sensor) 102, MMW radiometer (passive sensor) 104, IR laser radar 106, and passive IR sensor 108 (e.g., FLIR or IRST—infrared search and track). Additionally, multi-sensor system 100 may include data processor portion 118 which includes sensor parallel processor 120 and data fusion processor 122 which advantageously executes at least one predetermined algorithm to produce a valid target declaration output 124. Each sensor may scan a predetermined area (field of view) for an object (target) and receive data using antenna 110 (for the MMW sensors 102, 104) or lens 114, 116 (for IR sensors 106, 108). In accordance with the sensor-level fusion architecture selected, each sensor may have its individually received data processed (via parallel processor 120) using the predetermined algorithm that may be designed in accordance with a plurality of predetermined system parameters including received frequency band, active or passive operating mode of the individual sensor, sensor resolution and scanning characteristics, target and background signatures, and other predetermined system parameters. Results of the individual sensor processing may be input as a target report to the data fusion processor 122 (in response to a cue/query from the data fusion processor) where the results may be combined (fused) in accordance with the predetermined algorithm to produce an output decision 124 such as "validated target" or "no desired target encountered". Other output decisions 124, such as tracking estimates, may be produced in accordance with multi-sensor system output requirements. The tracking estimates may be used to form new tracking results, update existing tracking, and estimate future positions of the object (target).

Many multi-sensor systems (such as system 100 in FIG. 1) use feature-level fusion wherein features that help discriminate (find small distinctions) among objects (targets) are extracted from each individual sensor's data and then combined to form a composite feature vector representative of the object in each sensor's field of view. The composite feature vector may be input to a data processor (or neural network) and classification (recognition of the object as a house, tank, truck, man, etc.) of the object may then occur using a predetermined algorithm (incorporating the previously described processing techniques) to recognize the object of interest, differentiate the object from decoys (false targets), and produce a weighted value or function (e.g., reliability value or function) that links the observed object to a particular (predetermined) target with some probability, confidence, threat priority, or other quantitative/qualitative system output.

Currently, a data fusion method (strategy) that is widely used for feature-level systems is multiplicative fusion (e.g., Bayes or Dempster-Shafer methods). Commonly, the multiplicative fusion method multiplies a plurality of probability functions (generated from the received data from each individual sensor) to produce a single term (value). The generation of the single term makes it complex to weight contributions from the plurality of sensors (which may have different reliability values over different tracking time periods due to different sensor constraints, atmospheric conditions, or other factors) and thus may produce a less accurate data fusion output (decision output regarding target classification). Additionally, under certain conditions, a data fusion reliability output (using data from all sensors) may be worse than a single sensor reliability output.

Therefore, due to the disadvantages of the current multiplicative data fusion method, there is a need to provide a multi-sensor system that uses an additive data fusion method to produce multiple terms for weighting and determines a current, better performing (higher reliability) sensor to adaptively weight the contributions from the plurality of different sensors for improved reliability of target classification. Also, there is a need to provide a multi-sensor data fusion system that can adaptively weight multi-sensor reliability towards the better performing sensor (and away from a worse performing sensor) when predetermined conditions arise making the better single sensor reliability higher than the data fusion (combining all sensor data) reliability.

SUMMARY OF THE INVENTION

The method and system of the present invention overcome the previously mentioned problems by providing a multi-sensor data fusion system capable of adaptively weighting the contributions from a plurality of sensors in the system using an additive calculation of a sensor reliability function for each sensor. During a predetermined tracking period, data is received from each individual sensor in the system and a sensor reliability function is determined for each sensor based on the SNR (signal-to-noise ratio) for the received data from each sensor. Each sensor reliability function is individually weighted based on the SNR for each sensor and a comparison of predetermined sensor operation characteristics for each sensor and a better performing (higher reliability) single sensor. Additive calculations are performed on the reliability functions to produce both an absolute and a relative reliability function which provide a confidence level for the multi-sensor system relating to the correct classification (recognition) of targets and decoys.

BRIEF DESCRIPTION OF THE DRAWINGS

FIGS. 5a–5b show diagrams of exemplary sensor classification results for a multi-sensor system using multiplicative and additive data fusion in accordance with embodiments of the present invention.

DETAILED DESCRIPTION

Figure 1:
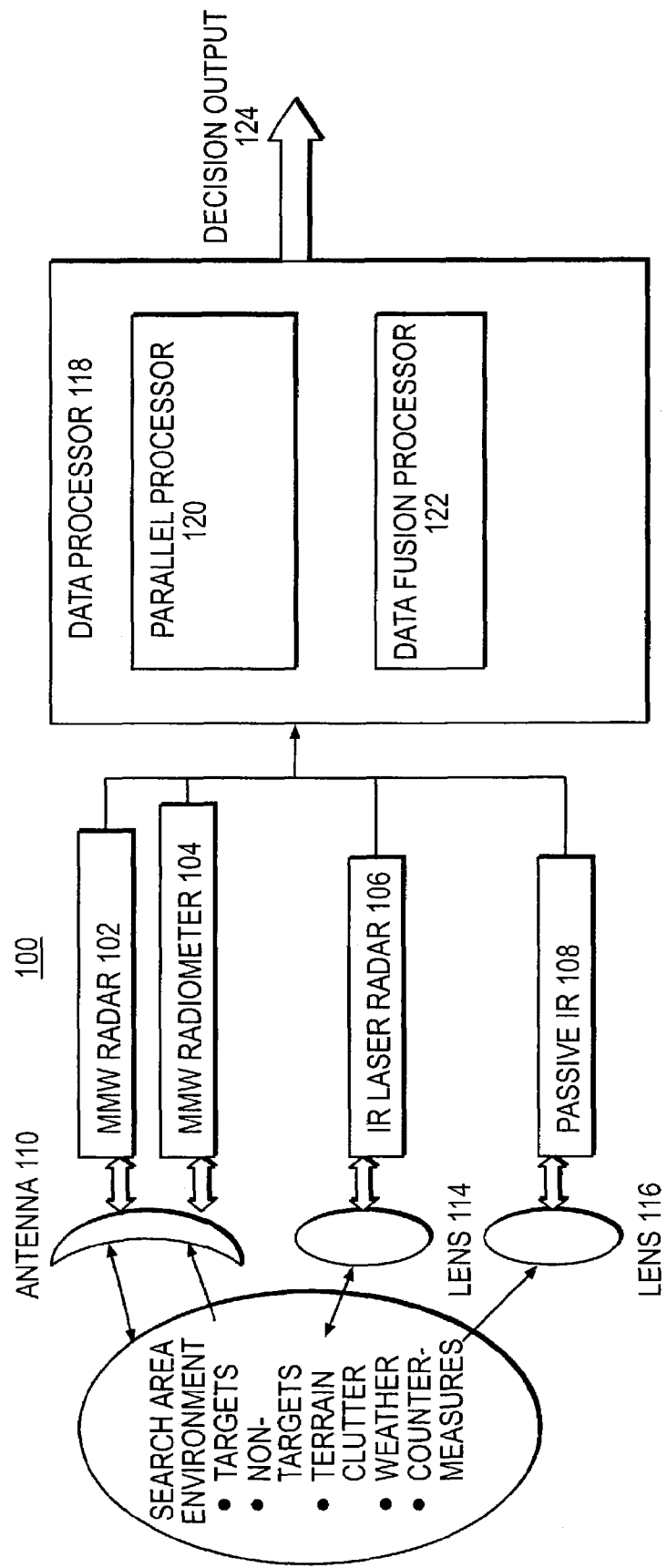
FIG. 1 is a block diagram of an exemplary sensor-level data fusion system found in the prior art.
Figure 2:
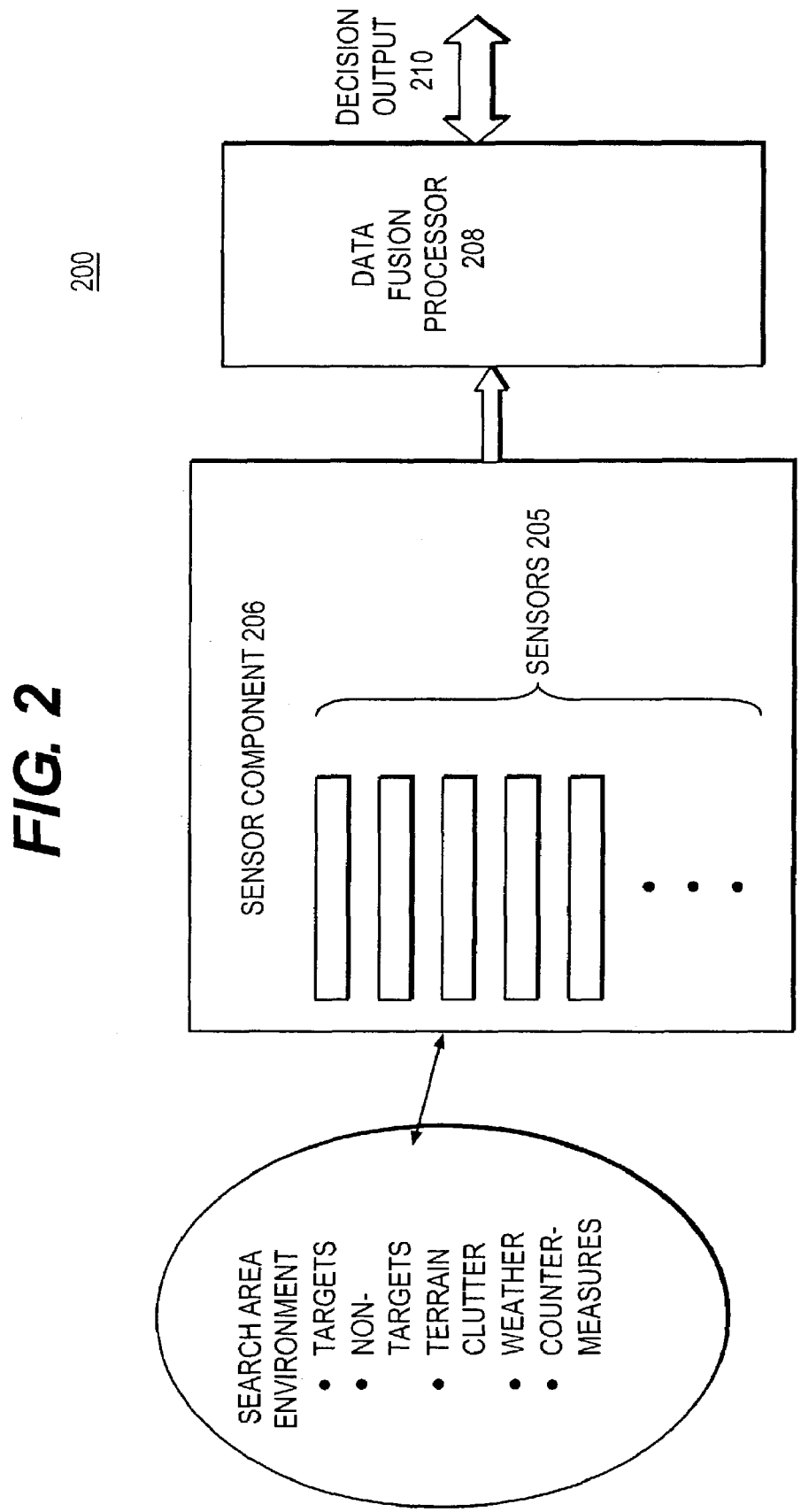
FIG. 2 is a functional block diagram of an exemplary multi-sensor, sensor-level data fusion system in accordance with embodiments of the present invention.

FIG. 2 shows a functional block diagram of an exemplary multi-sensor, sensor-level data fusion system 200 in accordance with embodiments of the present invention. Advantageously, multi-sensor system 200 may include sensor component 206 and a data fusion (integration) processor 208. Sensor component 206 may include a plurality of sensors 205 (and associated sensor processors) to receive and compute data from an object (target) within a predetermined scanning area (field of view) where the scanning data may include acoustic, electromagnetic (e.g., signal strength, SNR—signal-to-noise ratio, etc.), motion (e.g., range, direction, velocity, etc.), temperature, and other types of measurements/calculations of the object scanning area.

The plurality of sensors 205, using associated sensor processors, may each perform the well-known process of feature extraction to detect and pull out features which help discriminate the objects in each sensor's field of view and combine all the feature extractions (from each sensor) as a composite input to data fusion processor 208. Data fusion processor 208 may perform, as described in detail later, all levels of discrimination (detection, classification—recognition, identification, and tracking) of the object (target) using a predetermined data fusion algorithm to recognize the object of interest, differentiate the object from decoys (false targets), and produce at least one (system) weighted, reliability function that links the observed object to a predetermined target with some confidence level. The system reliability function may be used to generate a decision output 210 (target report) for target detection such as "validated target" or "no desired target encountered". Also, alternatively, plurality of sensors 205 may feed-through (without processing or with minimal processing) received data to processor 208 for feature extraction and target discrimination processing.

The particular combination of sensors 205 for system 200 may include a number of different sensors selected to provide exemplary predetermined system attributes (parameters) including temporal and spatial diversity (fusion), sensitivity, bandwidth, noise, operating range, transmit power, spatial resolution, polarization, and other system attributes. These different sensors may include, but are not limited to, passive and/or active sensors operating in the RF (radio frequency) range such as MMW (millimeter-wave) sensors, IR (infrared) sensors (e.g., Indium/Antimony—InSb focal plane array), laser sensors, and other passive and/or active sensors useful in providing the exemplary predetermined system attributes.

Figure 8:
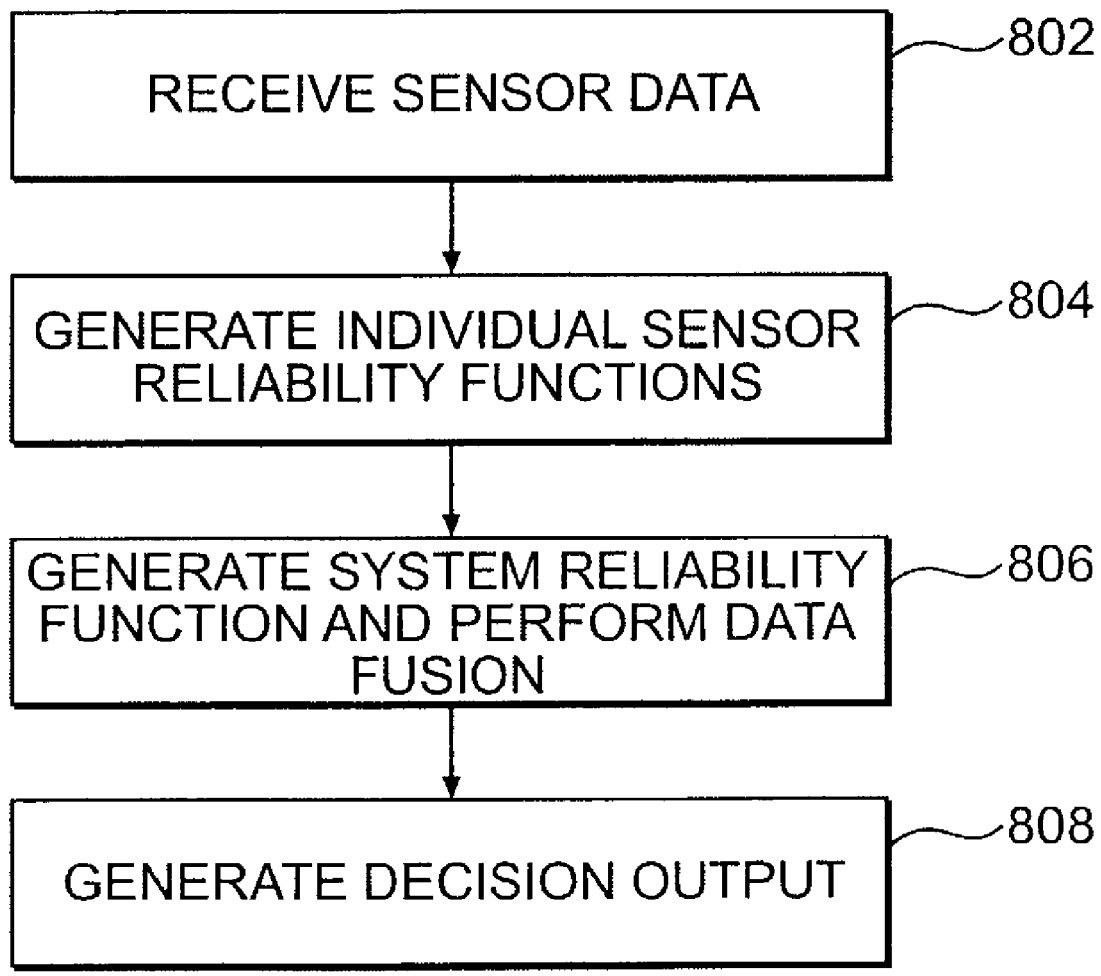
FIG. 8 shows a flowchart of an exemplary data fusion process in accordance with embodiments of the present invention.

During exemplary operation as described herein and in accordance with the flow process diagram shown in FIG. 8, at step 802, each one of the plurality of (differently located) sensors 205 may receive and calculate (compute) data about the object during a predetermined time (tracking) period over a plurality of time frames to provide spatial and temporal diversity for system 200. The computed data may include signal measurements (e.g., noise, radiance, reflection level, etc.) that are used to determine SNR (signal-to-noise ratio) for each sensor during the predetermined tracking period. Thereafter, at step 804, the computed SNR for each one of the plurality of sensors 205 may be used by data fusion processor 208 to generate a sensor reliability function for each sensor. Following step 804 of generating individual sensor reliability functions, at step 806 data fusion may be performed by data fusion processor 208 in accordance with a predetermined algorithm using adaptive weighting as described in detail later to generate at least one overall (combined) reliability function for system 200. Thereafter, at step 808, a decision output (target report) may be generated using the combined reliability function.

For multi-sensor system 200, there may be variations in sensor reliability among the plurality of sensors 205 (e.g., based on variations in SNR and other factors) during the tracking period such that the data fusion processor 208 (when performing data fusion) may determine and assign a higher weight to a best performing sensor (with the highest SNR) than a (lower) weight assigned to a worse (or worst) performing sensor (e.g., with a lower SNR) such that a fused result (combined reliability function for the plurality of sensors) may be weighted more towards the best performing (highest reliability) sensor. The variations in sensor reliabilities for the plurality of sensors 205 may be caused by a number of factors including weather conditions, different sensor attributes such as better range accuracy of an RF sensor than an IR sensor at longer ranges, or other factors causing at least one sensor to perform better than another sensor during a predetermined tracking period.

Advantageously during operation as described herein, the SNR may be used by data fusion processor 208 as a measure of sensor reliability during a predetermined tracking period to help generate a sensor reliability function for each one of the plurality of sensors 205. Thereafter, data fusion processor 208 may execute (perform) a predetermined data fusion algorithm incorporating additive and/or multiplicative calculation (of each individual sensor reliability function) to generate at least one overall (combined) reliability function for the multi-sensor system (full plurality of sensors). As part of generating the overall reliability function (for the plurality of sensors) in accordance with the fusion algorithm (process), data fusion processor 208 may adaptively weight (for a predetermined number of frames) each sensor reliability function based on the SNR (a measure of individual sensor reliability or confidence level) for each sensor during the tracking period.

However, under certain conditions (e.g., conditions causing a false alarm rate above a predetermined threshold), the fused (combined) reliability result determined (generated) by fusion processor 208 for the (entire) plurality of sensors (during the tracking period) may not be better than the individual sensor reliability result calculated from the performance of a better single sensor (e.g., the higher reliability sensor having the higher SNR). Therefore, the fusion processor 208 may use at least one additional predetermined sensor parameter (attribute) to better determine individual sensor reliability (function) weighting based on whether or not a data fusion result (generated from each sensor contributing) provides a more reliable result than a reliability result from a (better performing) single sensor.

Relying on predetermined measurements and analysis (e.g., testing and/or computer simulation of sensor operation), data fusion processor 208 may use the comparative (relative) received operating characteristics (ROC) between each sensor as the additional sensor parameter to help determine reliability weighting for each one of the plurality of sensors 205 during a predetermined tracking period. The ROC performance (curve) for each one of the plurality of sensors 205 may be generated (determined) using likelihood functions to represent (characterize) sensor information (during target tracking) such as (target) detections, no detections, measured SNRs, and other sensor information obtained from sensor measurements, observations, or other sensor data outputs. Thereafter, the ROC likelihood function for each sensor may be combined to generate likelihood (probability) functions of correct classification (recognition) of target and decoy (false target) for system 200.

For multi-sensor system 200, generation of the likelihood (probability) functions for correct classification ($P_{cc}$) of target and decoy using ROC likelihood function generation may include predetermination of the likelihood function for individual sensor noise caused by temporal fusion (diversity) as each sensor (auto) correlates data from multiple time frames (e.g., 120 time frames) during a predetermined tracking period. The temporal noise measurements (errors) for each one of the plurality of sensors 205 may be represented as a random variable (RV) where the negative impact of RV may be reduced using a plurality of methods including spatial and temporal fusion methods (used to combine data from differently located sensors and/or a single sensor outputting a plurality of data frames) to increase the probability of correct classification for a target and/or decoy ($P_{cc}$, $P_{ct}$). Spatial and temporal fusion methods may be used to generate a combined likelihood (pdf) function for differently located sensors and/or sensors having a plurality of data time frames.

ROC (received operating characteristics) performance curves may be generated using a plurality of methods including calculation of the combined probability density function (pdf or likelihood function) for a plurality of different fusion methods. The plurality of different fusion methods may include, but are not limited to, additive fusion, multiplicative fusion (e.g., Bayes and/or Dempster-Shafer), fuzzy logic fusion using minimum and/or maximum calculations, and other fusion methods (strategies) that help to minimize the errors associated with noise (represented by RV). Likelihood function (pdf) calculations for each fusion method that are combined using this ROC method are shown in Appendix A. Each fusion method may be based on a two-object (e.g., target—t, decoy—d), spatial fusion example (e.g., IR and RF sensor) where the likelihood functions (representing $P_{cc}$) may be expressed as p(t1), p(d1) for a first sensor (sensor1—IR), and by p(t2), p(d2) for a second sensor (sensor2—RF).

Alternatively, ROC curves may be generated using computer simulations (calculations) to generate a high number of random samples (e.g., 10,000) to represent RVs with different pdfs. Thereafter, the combined pdfs may be determined from the histograms of combined RVs based on the different fusion methods (shown in Appendix A). Exemplary diagrams of ROC performance curves (generated using the alternative method) representing the probability of correct classification (versus probability of false alarm) for the plurality of sensors 205 of system 200 are shown in FIGS. 7a–7d in accordance with an embodiment of the present invention. The probability of false alarm is the probability that a target or decoy is detected when actually there is no target or decoy (within the field of view of the plurality of sensors 205).

Figure 7A:
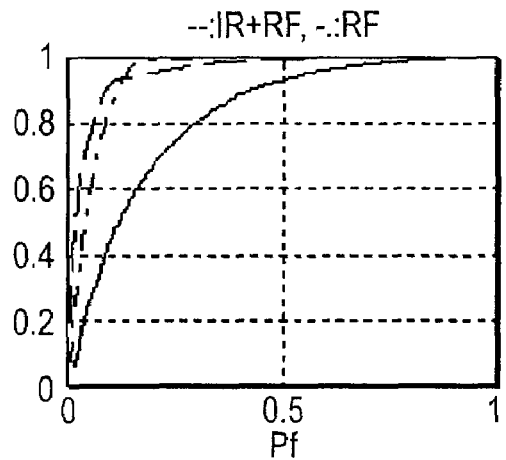
FIGS. 7a–7d show further diagrams of exemplary sensor classification for a multi-sensor system using additive fusion in accordance with embodiments of the present invention.
Figure 7B:
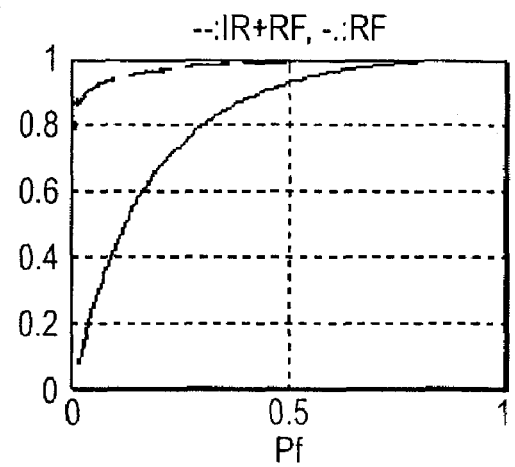
Figure 7C:
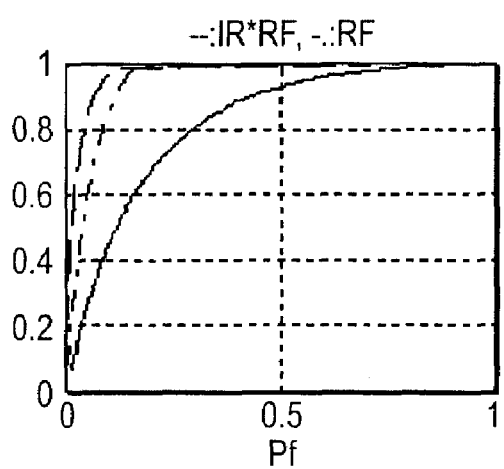
Figure 7D:
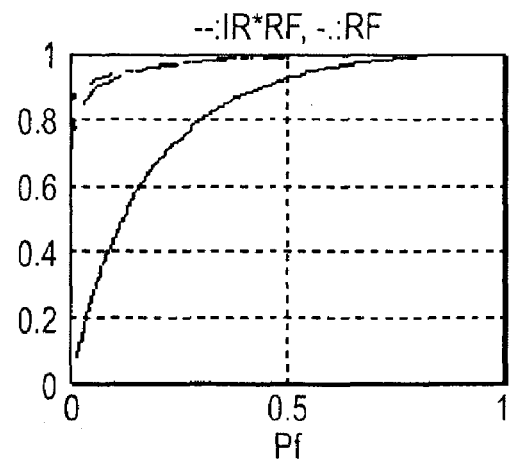

FIGS. 7a, 7b show exemplary curves of the probability of correct classification of decoy ($P_{cd}$—FIG. 7a) and target ($P_{ct}$—FIG. 7b) versus (vs.) probability of false alarm ($P_f$), respectively, for system 200 that may be generated using additive spatial fusion (shown in Appendix A) between the plurality of sensors 205 (e.g., IR sensor and RF sensor). Also, FIGS. 7c, 7d show exemplary curves of $P_{cd}$ (FIG. 7c) and $P_{ct}$ (FIG. 7d) vs. $P_f$, respectively, for system 200 that may be generated using multiplicative spatial fusion (shown in Appendix A) between the plurality of sensors 205 (e.g., IR sensor and RF sensor). For FIGS. 7a–7d, the solid curves show the $P_{cc}$ (ROC) performance of a single IR sensor, the dot-dashed curves show the $P_{cc}$ performance of a single RF sensor, and the dashed curves show the fused $P_{cc}$ performance between the RF and IR sensors. The exemplary curves shown in FIGS. 7a–7d may be generated using an RF sensor and an IR sensor, but it is noted that the selection of these sensors is solely exemplary and should not be viewed as a limitation upon the invention.

As shown in FIGS. 7a, 7c, the fused $P_{cd}$ performance (dashed curve) for both additive and multiplicative fusion may be better (probability of correct classification closer to 1) than the single sensor performance of either the RF or IR sensor where (as shown in FIGS. 7a, 7c) the RF sensor is the better individual (single) sensor. Alternatively, as shown in FIGS. 7b, 7d, the single RF sensor performance (dot-dashed curve) may be better than either the fused $P_{ct}$ performance for both additive and multiplicative fusion or the single IR sensor performance.

As shown in FIGS. 7b, 7d, when the plurality of sensors 205 have very dissimilar ROC performances (showing a large difference), the fused ROC ($P_{cc}$) performance may be worse than the better single sensor (e.g., RF) ROC performance, but still better than the worse single sensor (e.g., IR) ROC performance which may indicate that the worse single sensor is negatively impacting (dragging down) the fused ROC performance. In response to this situation, data fusion processor 208 may assign less weight to the contribution (sensor reliability function) generated from the worse sensor (e.g., IR) such that the fused (combined) system reliability function generated by processor 208 is weighted more towards the contribution (sensor reliability function) generated from the better single sensor (e.g., RF) to improve system reliability.

Also, as shown in FIGS. 7a, 7c, the fused ROC performance is only better than the better single sensor ROC performance when a Pf threshold (calculated critical false alarm rate or probability of false alarm threshold) is not reached (satisfied) as the fused and better single sensor ROC performances curves reach substantially the same value (approximately a probability of 1) after this $P_f$ threshold is reached. In response to this situation, data fusion processor 208 may generate a system (combined) reliability function based on each sensor SNR and an F/S ratio where the F/S ratio may represent the ratio between the fused ROC performance and the better single sensor ROC performance and be dependent on the false alarm rate (fa) function and the critical false alarm rate. Advantageously, the predetermined ROC performance curves of FIGS. 7a–7d and predetermined calculations of the critical false alarm rate and F/S ratio may be entered into a fusion table and input to data fusion processor 208 along with the other data (e.g., SNR measurements) from the plurality of sensors 205 to use during performance of the data fusion algorithm.

Individual sensor reliability functions for each one of the plurality of sensors 205 may be expressed using the calculations and conditions shown in Appendix B. An optimal value (e.g., 0.5) for linear coefficient a may be determined from testing/simulation of weather (flight) conditions (of the sensor's field of view) for multi-sensor system 200. SNR may be dynamically calculated (estimated) from time frame to time frame for each one of the plurality of sensors 205 by measuring (calculating) the feature signal intensity for each frame, and dividing that value by the measured noise standard deviation for each frame. Alternatively, SNR may be calculated from a summation of the ignorance sets from a Dempster-Shafer computation as a measure of the noise intensity as disclosed in the cross-referenced provisional application Ser. No. 60/367,282, filed Mar. 26, 2002.

Data fusion processor 208 may use a plurality of fusion methods (algorithms) to generate relative and absolute reliability functions (levels) for multi-sensor system 200. The plurality of fusion methods may include a fusion method based on SNR (shown in Appendix C), a fusion method based on F/S ratio (shown in Appendix D), and a fusion method based on SNR and F/S ratio (shown in Appendix E). The methods may be based on a two-object (e.g., target—t, decoy—d), spatial fusion example (e.g., IR and RF sensor) where the likelihood functions (representing $P_{cc}$) may be expressed as p(t1), p(d1) for a first sensor (sensor1—IR), and by p(t2), p(d2) for a second sensor (sensor2—RF), and where the reliability for sensor1 at a particular time frame may be defined as rel1 and the reliability for sensor2 (at the same particular time frame) may be defined as rel2.

In accordance with embodiments of the present invention, (simulated) results of the additive data fusion algorithm (as shown in Appendices C, D, E) performed by multi-sensor system 200 are shown in FIGS. 3–6. FIG. 3a shows a graph of IR sensor performance (likelihood function) results and FIG. 3b shows a graph of RF sensor performance results. The likelihood (reliability) functions for FIGS. 3a, 3b may be generated using a plurality of random data samples (e.g., 300 time frames) as a performance data set (including decoy and target performance data) to produce the classification ($P_{cc}$) performance diagrams. For an exemplary scenario, the IR sensor noise level shown in FIG. 3a (background mean level of 1000 counts) may be simulated as normal distribution with a standard deviation of 10, and the RF sensor noise level in FIG. 3b may be simulated as a Rayleigh distribution with a standard deviation of 6.5.

Figure 3A:
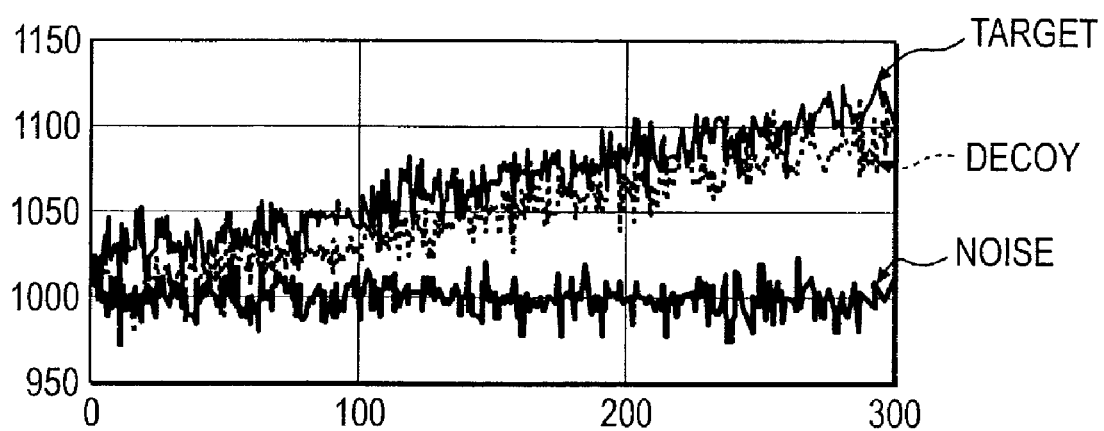
FIGS. 3a–3b show graphs of exemplary sensor performance results for a multi-sensor data fusion system in accordance with embodiments of the present invention.
Figure 3B:
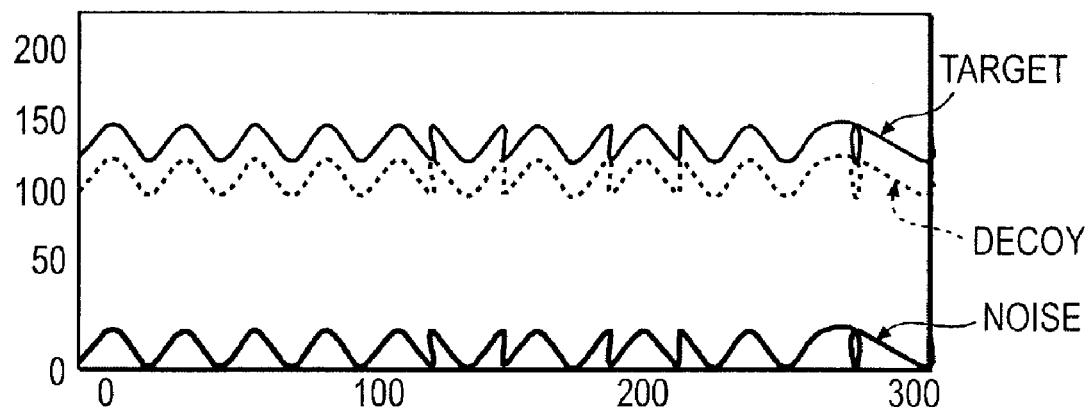

As shown in FIG. 3a, the IR sensor decoy count may start at 1003 at the first time frame (only 3 above the IR sensor noise level of 1000 counts), and then jump to 1100 counts by the last time frame (during the flight) indicating an SNR (decoy) rise from 0.3 to 10. Also, the IR sensor target count (as shown in FIG. 3a) may start at 1020 (at the first time frame), and then jump to 1120 by the last time frame indicating an SNR (target) rise from 2 to 12. As shown in FIG. 3b, the SNR for the RF sensor remains high for all 300 time frames indicating a reliability function equal to 1.

Figure 4A:
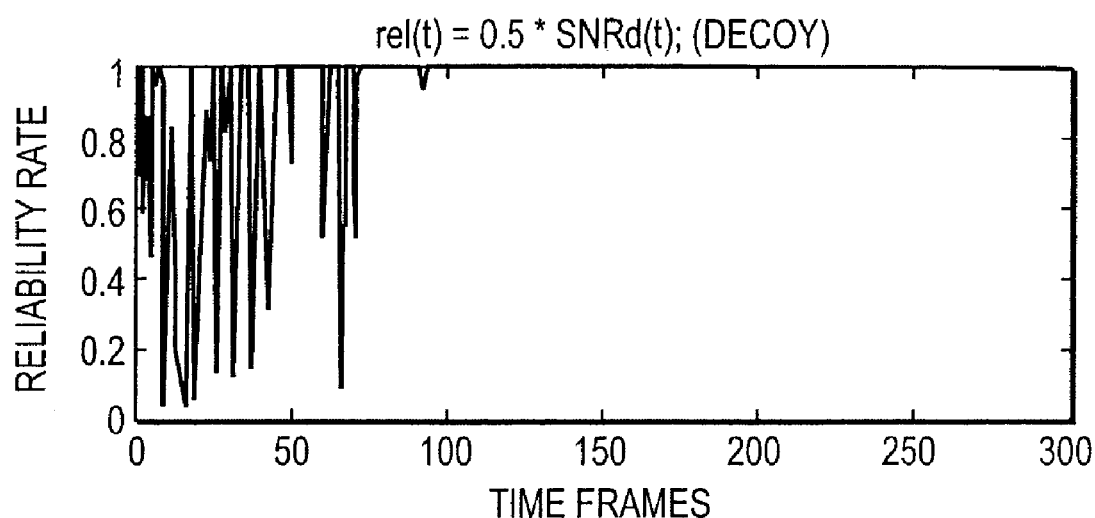
FIGS. 4a–4b show diagrams of exemplary sensor reliability results for a multi-sensor data fusion system in accordance with embodiments of the present invention.
Figure 4B:
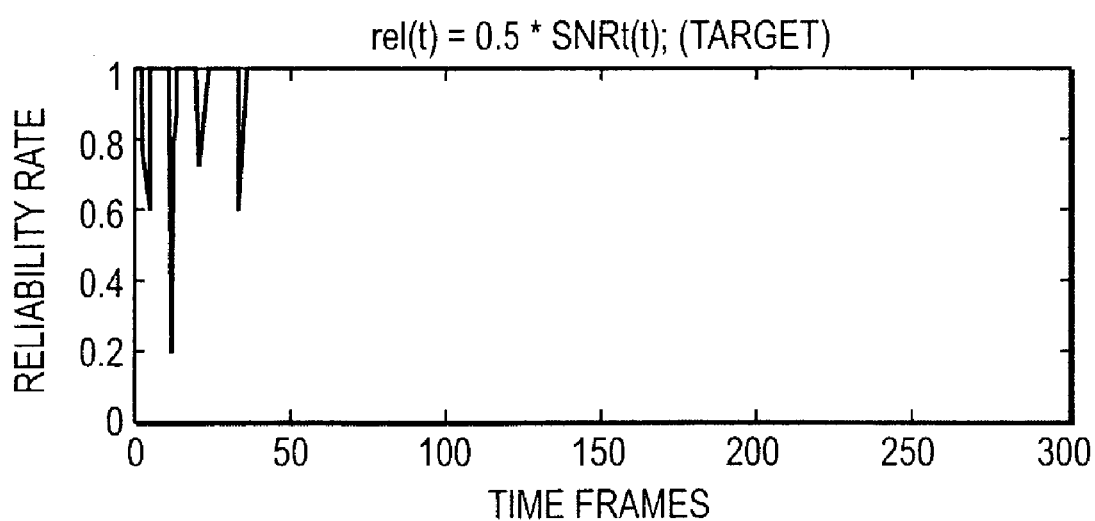

FIGS. 4a, 4b show diagrams of exemplary IR and RF sensor reliability functions (e.g., rel(t) as shown in Appendix B) for 300 time frames of decoy and target performance data, respectively. As shown in FIG. 4a for the decoy reliability, the IR sensor may be less reliable in the early time frames (e.g., t<50) since during that time period the feature intensities (discriminations) of the decoy are closer to the noise indicating a lower SNR (as shown in FIG. 3a). As shown in Appendix B in equation (1), the reliability function (rel(t)=a*SNR(t)), may be a linear function where the linear coefficient a=0.5.

FIGS. 5–6 show diagrams of exemplary classification results for spatial fusion between the plurality of sensors 205 including an IR and RF sensor. FIGS. 5a, 5b show the resulting diagrams of combined multiplicative and additive fusion (with adaptive, reliability weighting as described herein) using equations (2) and (3) from Appendix C. As shown in FIGS. 5a, 5b the $P_{ct}$ may be improved to 98% and the probability of misclassification ($P_{mc}$) reduced to 2% (as compared to $P_{ct}$ of 96% and $P_{mc}$ of 4% with prior art multiplicative fusion without using reliability weighting), and the $P_{cd}$ may be improved to 95% and the false alarm rate (Rfs (fa,t)) reduced to 5% (as compared to $P_{cd}$ of 89% and Rfs of 11% with prior art multiplicative fusion without using reliability weighting). As shown in FIG. 5b, the Rfs is very low during the early time frames of low SNR condition (e.g., t<50) leading to an approximate improvement of $P_{cd}$ to 95% (as compared to $P_{cd}$ of 60% under low SNR conditions using prior art multiplicative fusion without using weighting).

Figure 6A:
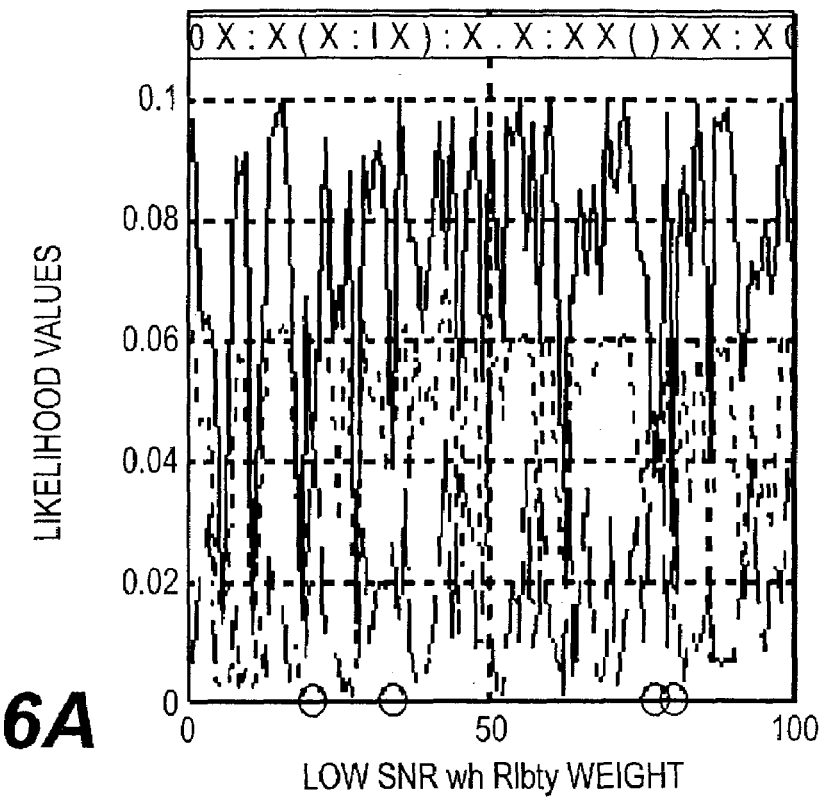
FIGS. 6a–6b show diagrams of exemplary sensor classification results for a multi-sensor system using additive data fusion in accordance with embodiments of the present invention.
Figure 6B:
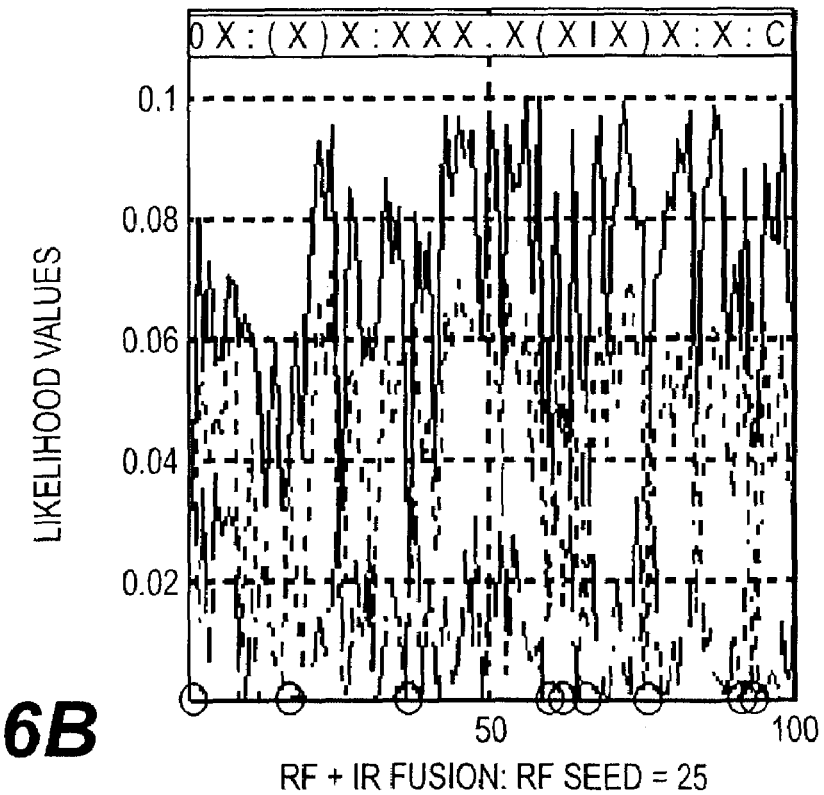

FIGS. 6a, 6b show the resulting diagrams of combined additive fusion (with adaptive, reliability weighting as described herein) using equations (7) and (8) from Appendix C. As shown in FIGS. 6a, 6b the $P_{ct}$ may be improved to 96% and the $P_{mc}$ reduced to 4% (as compared to $P_{ct}$ of 95% and Rfs of 5% with additive fusion without using reliability weighting), and the $P_{cd}$ may be improved to 94% and Rfs reduced to 6% (as compared to $P_{cd}$ of 88% and Rfs of 12% with additive fusion without using reliability weighting). As shown in FIG. 6b, the Rfs is very low during the early time frames of low SNR condition (e.g., t<50) leading to an approximate improvement of $P_{cd}$ to 94% (as compared to $P_{cd}$ of 60% under low SNR conditions using additive fusion without using reliability weighting).

A plurality of advantages may be provided in accordance with embodiments of the present invention including a data fusion method (incorporating additive fusion) that adaptively weights the contributions from different sensors (within a multi-sensor system) to generate at least two system reliability functions (relative and absolute reliability) where SNR and relative ROC performance between sensors may be used as measures of reliability.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

APPENDIX A

Additive Fusion $$p(t)=p(t1)+p(t2),$$

and $$p(d)=p(d1)+p(d2)$$

For two independent random variables (RVs), X and Y, the combined pdf of the summation of these two RVs (Z=X+Y) may be calculated as the convolution of the two individual pdfs:

$$f_z(z)=\int f_X(x)f_Y(z-x)dx$$

(from 0 to ∞).

For an additive fusion example, $$f_{p(t)}(p(t))=\int f_{p(t1)}(p(t1))f_{p(t2)}(p(t)-p(t1))\, dp(t1)$$

(from 0 to ∞), and $$f_{p(d)}(p(d))=\int f_{p(d1)}(p(d1))\, f_{p(d2)}(p(d)-p(d1))\, dp(d1)$$

(from 0 to ∞),

The fused classification performance of the ROC curves may be estimated from the combined probability density functions (pdfs) in the above equations where the results are shown in FIGS. 7a–7d.

Multiplication (the Bayes) Fusion $$p(t)=p(t1)*p(t2), \text{ and } p(d)=p(d1)*p(d2).$$

The two independent RVs, X and Y, the combined pdf of the multiplication of these two RVs (Z=X*Y) may be calculated as the nonlinear convolution of the two individual pdfs:

$$f_z(z)=\cdot(1/|x|)F_X(x)f_Y(z/x)\, dx \text{ (from 0 to ∞).}$$

For a multiplication fusion example, $$f_{p(t)}(p(t))=\cdot 1/|p(t1)|f_{p(t1)}(p(t1))\, f_{p(t2)}(p(t)/p(t1)) \text{ (from 0 to ∞),}$$

and $$f_{p(d)}(p(d))=\cdot 1/|p(d1)|f_{p(d1)}(p(t1)) \quad f_{p(d2)}(p(d))/p(d1))dp(d1)$$
(from 0 to ∞).

The Relationship Between Additive and Multiplication Fusions

If the logarithm on both sides of the above-identified multiplication fusion equations is performed, then $$\ln[p(t)]=\ln[p(t1)]+\ln[p(t2)], \text{ and } \ln[p(d)]=\ln[p(d1)]+\ln[p(d2)].$$

The one multiplication term becomes two additive terms of logarithm functions in each of the equation. If two RVs have log-normal pdfs, the equations above indicate that the multiplicative fusion of two RVs with log-normal distributions may be equivalent to the additive fusion of two RVs with normal distributions.

MIN, MAX, and MINMAX Fusions

The conjunction (AND) and disjunction (OR) are two well-known functions used in Fuzzy Logics. For two independent RVs: X and Y, the combined pdf of the conjunction of these two RVs [Z=min (X, Y)] may be given as:

$$f_z(z)=f_x(z)[1-F_Y(z)]+f_Y(z)[1-F_x(z)],$$

where F(z) is the cumulative distribution function.

Similarly, for two independent RVs: X and Y, the combined pdf of the disjunction of these two RVs [Z=max(X, Y)] may be given as:

$$F_x(z)=f_x(z)F_Y(z)+f_Y(z)F_x(z).$$

For a two-object example, the MIN (conjunction) fusion may be defined as:

$$p(t)=\min[p(t1), p(t2)], \text{ and } p(d)=\min[p(d1), p(d2)]$$

The MAX (disjunction) fusion may be defined as:

$$p(t)=\max[p(t1), p(t2)], \text{ and } p(d)=\max[p(d1), p(d2)].$$

The MINMAX fusion stategy may enhance one class (e.g., the target) over the other (e.g., the decoy). In some situations (e.g., target is the incoming missile warhead and the system is attempting to intercept the missile), the Pcc for the target should be as high as possible although the false alarm rate will be similarly increased. At the detection stage, the CFAR (constant false-alarm ratio) may be modified to change the Pd. At higher feature levels of fusion, the MINMAX fusion method may be used for this purpose.

For enhancing the target,
$p(t)=\max[p(t1), p(t2)]$, and
$p(d)=\min[p(d1), p(d2)]$.
For enhancing the decoy,
$p(t)=\min[p(t1), p(t2)]$, and
$p(d)=\max[p(d1), p(d2)]$.

APPENDIX B

For $0\leq \text{rel}(t)\leq 1$, a reliability function, "rel (t)", may be defined as a linear function of signal-to-noise ratio (SNR):
rel (t)={a* SNR (t), or 1 if rel (t)>1, (1)
where a is a linear coefficient, and t is a time frame number.

APPENDIX C

If rel2>rel1, then the relative reliability (rrel) may be expressed as:
rrel1=rel1/rel2, and rrel2=rel1/rel2=1.
Alternatively, if rel1>rel2, then rrel may be expressed as:
rrel1=rel1/rel1=1, and rrel2=rel2/rel1.
For an exemplary scenario, if rel1=0.6 and rel2=0.8, then rrel1=0.6/0.8=0.75, and rrel2=0.8/0.8=1.
Fr rel2>rel1, a combination of additive and multiplicative fusion may be expressed as:
$p(t)=\text{rrel1}* [p(t1)*p(t2)]+(1-\text{rrel1})*p(t2)$, (2)
$p(d)=\text{rrel1}* [p(d1)*p(d2)]+(1-\text{rrel1})*p(d2)$. (3)
Alternatively, if rel1>rel2, then
$p(t)=\text{rrel2}*[p(t1)*p(t2)]+(1-\text{rrel2})*p(t1)$, (5)
$p(d)=\text{rrel2}*[p(d1)*p(d2)]+(1-\text{rrel2})*p(d2)$. (6)
Also, for additive fusion, if rel2>rel1, then
$p(t)=\text{rrel1}*p(t1)+p(t2)$, (7)
$p(d)=\text{rrel1}*p(d1)+p(d2)$. (8)
Alternatively (for additive fusion), if rel1>rel2, then $$p(t)=\text{rrel2}*p(t2)+p(t1), \qquad (9)$$

$$p(d)=\text{rrel2}*p(d2)+p(d1). \qquad (10)$$

As shown in equations (2), (3), when the relative reliability function (rrel1) −1, then the equation dissolves into the traditional multiplicative fusion.

Also, absolute reliability may be expressed as:
For a combination of additive and multiplicative fusion, $$p(t)=rel1*rel2*[p(t1)*p(t2)]+(1-rel1)*p(t2)+(1-rel2)*p(t1), \quad (11)$$

$$p(d)=rel1*rel2*[p(d1)*p(d2)]+(1-rel1)*p(d2)+(1-rel2)*p(d1), \quad (12)$$

And for additive fusion, $$P(t)=rel1*p(t1)+rel2*p(t2), \quad (13)$$

$$P(d)=rel1*p(d1)+rel2*p(d2) \quad (14)$$

APPENDIX D

Reliability Function Using F/S Ratio

For $0 \leq rl(t) \leq 1$, a reliability function may be defined as a linear function of F/S ratio:

$$rl(t)=\{Rfs(fa,t), \text{ or } 1 \text{ if } Rfs(fa,t)>1 \quad (15)$$

where t is the time frame number, fa is the false alarm rate, Rfs( ) is the F/S ratio, and $$Rfs(fa,t)=\{Rfs(a,t), \text{ or } 1 \text{ if } fa<CFA \quad (16)$$

Where CFA is the critical false alarm rate

For a combination of additive and multiplicative fusion at a specific time frame, and when comparing any two sensors of a plurality of sensors, if sensor2 is the better sensor (the sensor with better ROC performance), then $$p(t)=rl*[p(t1)*p(t2)]+(1-rl)*p(t2), \quad (17)$$

$$p(d)=rl*[p(d1)*p(d2)]+(1-rl)*p(d2). \quad (18)$$

If sensor1 is the better sensor, then $$p(t)=rl*[p(t1)*p(t2)](1-rl)*p(d2), \quad (19)$$

$$p(d)=rl*[p(d1)*p(d2)]+(1-rl)*p(d1). \quad (20)$$

For additive fusion, if sensor2 is the better sensor, then $$p(t)=rl*p(t1)+p(t2), \quad (21)$$

$$p(d)=rl*p(d1)+p(d2). \quad (22)$$

If sensor1 is the better sensor, then $$p(t)=p(t1)+rl*p(t2), \quad (23)$$

$$p(d)=p(d1)+rl*p(d2). \quad (24).$$

APPENDIX E

Reliability Function Using Both SNR and F/S Ratio

For additive fusion and using relative reliability for SNR, if rel2>rel1 and sensor1 is the better sensor, then $$p(t)=rrel1*p(t1)+rl*p(t2), \quad (25)$$

$$p(d)=rrel1*p(d1)+rl*p(d2), \quad (26)$$

If sensor2 is the better sensor, then $$p(t)=rl*rrel1*p(t1)+p(t2), \quad (27)$$

$$p(d)=rl*rrel1*p(d1)+p(d2), \quad (28)$$

If rel1>rel2 and sensor1 is the better sensor, then $$p(t)=rl*p(t1)+rrel2*p(t2), \quad (29)$$

$$p(d)=rl*p(d1)+rrel2*p(d2), \quad (30)$$

For additive fusion and using absolute reliability for SNR, if sensor1 is the better sensor, then $$p(t)=rel1*p(t1)+rl*rel2*p(t2), \quad (31)$$

$$p(d)=rel1*p(d1)+rl*rel2*p(d2), \quad (32)$$

If sensor2 is the better sensor, then $$p(t)=rl*rel1*p(t1)+rel2*p(t2), \quad (33)$$

$$p(d)=rl*rel1p(d1)+rel2*p(d2). \quad (34)$$

What is claimed is:

1. A method for integrating data received from a plurality of sensors, comprising:
    receiving data from a plurality of sensors;
    determining a SNR (signal-to-noise ratio) for each sensor based on signal measurements of the received data; and
    determining at least one reliability function for the plurality of sensors as a predetermined additive calculation of each sensor reliability function which are determined and individually weighted based on said SNR for each sensor and differences between predetermined operating characteristics for each sensor.

2. The method of claim 1, wherein said determining at least one reliability function includes determining at least one of an absolute reliability and a relative reliability function.

3. The method of claim 1, wherein said receiving includes receiving data, during a predetermined time period, over a plurality of time frames from said plurality of sensors.

4. The method of claim 1, wherein said determining at least one reliability function includes determining said individual weighting based on a predetermined parameter for the plurality of sensors satisfying a predetermined threshold, and determining said at least one reliability function as a predetermined additive calculation of a single sensor reliability function when said predetermined parameter fails to satisfy said predetermined threshold.

5. The method of claim 4, wherein said predetermined parameter is a false alarm rate for the plurality of sensors.

6. The method of claim 1, wherein said determining at least one reliability function includes determining said at least one reliability function based on differences between probabilities of classification for each sensor as compared to a single sensor having the highest probability of classification.

7. The method of claim 1, wherein said plurality of sensors includes at least one of a laser, IR (infrared), and RF (radio frequency) sensor.

8. The method of claim 1, wherein said determining at least one reliability function includes determining said at least one reliability function based on said predetermined additive and one of predetermined multiplicative, and fuzzy logic calculation of each said sensor reliability function.

9. The method of claim 8, wherein said determining at least one reliability function includes determining empty sets and ignorance sets for the received data from the plurality of sensors based on said predetermined multiplicative calculation.

10. The method of claim 9, wherein said predetermined multiplicative calculation includes at least a modified portion of a Dempster's data fusion algorithm.

11. The method of claim 1, wherein said determining at least one reliability function includes determining said at least one reliability function based on determining a single sensor, as compared to the plurality of sensors, as having the best performance for at least one predetermined sensor parameter.

12. The method of claim 11, wherein said at least one predetermined sensor parameter is one of operating characteristics and SNR for said single sensor.

13. The method of claim 11, wherein said single sensor is one of an IR and RF sensor.

14. The method of claim 1, wherein said determining at least one reliability function includes determining said at least one reliability levels to increase the probability of classifying one of a target and decoy above a predetermined threshold.

15. A method for integrating data received from a plurality of sensors, comprising:
receiving data from a plurality of sensors;
determining a SNR (signal-to-noise ratio) for each sensor based on signal measurements of the received data; and
determining at least one reliability function for the plurality of sensors as a predetermined additive calculation of each sensor reliability function which are determined and individually weighted based on said SNR for each sensor.

16. A method for integrating data received from a plurality of sensors, comprising:
receiving data from a plurality of sensors;
determining at least one reliability function for the plurality of sensors as a predetermined additive calculation of each sensor reliability function which are determined and individually weighted based on differences between predetermined operating characteristics for each sensor.

17. A multi-sensor system, comprising:
a plurality of sensors for receiving data; and
a controller for performing the steps of:
determining a SNR (signal-to-noise ratio) for each sensor based on signal measurements of the received data; and
determining at least one reliability function for the plurality of sensors as a predetermined additive calculation of each sensor reliability function which are determined and individually weighted based on said SNR for each sensor and differences between predetermined operating characteristics for each sensor.

18. The system of claim 17, wherein said controller to determine said at least one reliability function including one of an absolute reliability and a relative reliability function.

19. The system of claim 17, wherein said controller to determine said individual weighting based on a predetermined parameter for the plurality of sensors satisfying a predetermined threshold, and said controller to determine said at least one reliability function as a predetermined additive calculation of a single sensor reliability function when said predetermined parameter fails to satisfy said predetermined threshold.

20. The system of claim 19, wherein said predetermined parameter is a false alarm rate for the plurality of sensors.

21. The system of claim 17, wherein said plurality of sensors includes at least one of a laser, IR (infrared), and RF (radio frequency) sensor.

22. A machine-readable medium having stored thereon a plurality of executable instructions, the plurality of instructions comprising instructions to:
receive data from a plurality of sensors;
determine a SNR (signal-to-noise ratio) for each sensor based on signal measurements of the received data; and
determine at least one reliability function for the plurality of sensors as a predetermined additive calculation of each sensor reliability function which are determined and individually weighted based on said SNR for each sensor and differences between predetermined operating characteristics for each sensor.

23. The medium of claim 22, wherein said instructions to determine at least one reliability function include instructions to determine one of an absolute and a relative reliability function.

24. The medium of claim 22, wherein said instructions to determine at least one reliability function include instructions to determine said individual weighting based on a predetermined parameter for the plurality of sensors satisfying a predetermined threshold.

25. The medium of claim 22, wherein said instructions to determine at least one reliability function include instructions to determine said at least one reliability function based on differences between probabilities of classification for each sensor as compared to a single sensor having the highest probability of classification.

26. The medium of claim 22, wherein said instructions to determine at least one reliability function include instructions to determine said at least one reliability function based on said predetermined additive and one of predetermined multiplicative, minimum, and maximum calculation of each sensor reliability function.

27. The medium of claim 22, wherein said instructions to determine at least one reliability function include instructions to determine said at least one reliability function to increase the probability of classifying one of a target and a decoy above a predetermined threshold.

* * * * *